US006195117B1

(12) United States Patent
Miyazaki

(10) Patent No.: US 6,195,117 B1
(45) Date of Patent: Feb. 27, 2001

(54) VIDEO CONFERENCE RESERVATION SYSTEM AND STORAGE MEDIA FOR STORING THEREIN VIDEO CONFERENCE RESERVATION PROGRAM

(75) Inventor: Makoto Miyazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/217,417

(22) Filed: Dec. 21, 1998

(30) Foreign Application Priority Data

Dec. 25, 1997 (JP) .................................................. 9-357545

(51) Int. Cl.[7] ...................................................... H04N 7/14
(52) U.S. Cl. ........................ 348/15; 379/93.21; 379/93.24
(58) Field of Search .................................. 348/14, 15, 16; 379/202, 93.24, 93.21; 370/260; 709/204, 205

(56) References Cited

U.S. PATENT DOCUMENTS 5,642,156 * 6/1997 Saiki ..................................... 379/202

FOREIGN PATENT DOCUMENTS 6-141083   5/1994 (JP) .
408317367 * 11/1996 (JP) ................................ H04N/7/15

* cited by examiner

*Primary Examiner*—Curtis A. Kuntz
*Assistant Examiner*—Melur Ramakrishnaiah
(74) *Attorney, Agent, or Firm*—Ostrolenk, Faber, Gerb & Soffen, LLP

(57) ABSTRACT

A video conference reservation system enables reservation of a video conference to be implemented without using a special purpose terminal for video conference reservation, and enables a distributed conference notification to be referred to without using the special purpose terminal while distributing the conference notification automatically. There is reserved a video conference to a conference control device from the first to the n-th conference member terminals through the first circuit network. The conference control device prepares a conference notification using a conference establishment information, subsequently establishing distribution destination of the prepared conference notification, thus distributing the conference notification to the established distribution destination through an electronic mail.

1 Claim, 6 Drawing Sheets

FIG.5

ISSUE MARCH 1,1997

VIDEO CONFERENCE NOTIFICATION

| | |
|---|---|
| TITLE OF CONFERENCE | SALES PROMOTION CONFERENCE |
| DAY AND TIME | AT3P.M. TO AT5P.M. |
| CONFERENCE NUMBER | 031001 |
| COMMUNICATION DESTINATION | POST   SALES HEAD OFFICE |
| | NAME  ICHIRO SUZUKI |
| | e-mail  suzuki@aaa.bbb.jp |
| | TEL NUMBER  333-5555 |
| CONFERENCE CLASSIFICATION | MULTI POINTS CONFERENCE |
| CONNECTION SPEED | 384 Kbps(H0) |

| PARTICIPATION CONFERENCE ROOM | ORIGIN/RECEPTION SPECIFICATION | DIAL NUMBER |
|---|---|---|
| SALES HEAD OFFICE (1) | ORIGIN | 0344445555 |
| HOKKAIDO BRANCH (2) | ORIGIN | 0111112222 |
| TOHOKU BRANCH (3) | ORIGIN | 022222333 |
| CHUBU BRANCH (5) | ORIGIN | 0333334444 |
| KANSAI BRANCH (6) | ORIGIN | 0444445555 |
| CHUGOKU BRANCH (7) | ORIGIN | 0555556666 |

MEMO

VIDEO CONFERENCE RESERVATION SYSTEM AND STORAGE MEDIA FOR STORING THEREIN VIDEO CONFERENCE RESERVATION PROGRAM

BACKGROUND OF THE INVENTION

The present invention relates to a video conference reservation system for holding the video conference automatically with the video conference reserved.

DESCRIPTION OF THE PRIOR ART

Formerly, the video conference reservation system is in use for holding the video conference automatically while reserving the day and time when a conference is held beforehand at the time when the video conference is held.

In general, reservation of the video conference is implemented in such a way that there is established the day and time when a conference is held and so forth by the special purpose terminal, and the notification of holding conference is printed by the printer and so forth.

In the above-described conventional video conference reservation system, there is pointed the following problems. Namely, only the special purpose terminal can reserve the video conference when intending to reserve the video conference. For this reason, it is incapable of reserving the video conference at the place where the special purpose terminal does not exist.

Further, there is consumed time for separately distributing a conference notification widely to the participants of the video conference because there is printed the notification of holding conference for distribution.

The Japanese Patent Application Laid-Open No. HEI 6-141083 discloses that there is automatically formed a notification manuscript of holding conference by means of the transmission side remote conference terminal device, then transmitting the notification of holding conference to the reception side remote conference terminal device through the integrated services digital network (ISDN).

In the above-described conventional video conference reservation system, since there is automatically formed the notification manuscript of holding conference by means of the remote conference terminal device, thus transmitting the notification of holding conference to the reception side remote conference terminal device through the integrated services digital network (ISDN), it is capable of only delivering the notification of holding conference.

However, it is no change in that the reservation of video conference is implemented by means of special purpose terminal, thus it is necessary to reserve the video conference while going to established place when reserving. Further, even though there is distributed the notification of holding conference, it is incapable of satisfying demand of intending to distribute to the participants directly because there is distributed the notification of holding conference to the special purpose terminal, thus the participants are to refer the notification of holding conference while going to the established place of the special purpose terminal.

SUMMARY OF THE INVENTION

In view of the foregoing it is an object of the present invention is to provide a video conference reservation system and storage media for storing therein video conference reservation program in which it is capable of implementing reservation of the video conference without going to the established place of special purpose terminal for the reservation, and automatically forming the notification of holding conference in accordance with the reserved establishment information, thus enabling it to be distributed automatically to the distribution destination.

It is another object of the present invention to provide a video conference reservation system in which it is capable of referring to the distributed notification of holding conference without going to the established place of the special purpose terminal.

According to one aspect of the present invention, for achieving the above-mentioned objects, there is provided a video conference reservation system in which there is established a video conference beforehand comprising a conference information establishment means for establishing the conference information of the video conference, a conference information management means for managing the conference information from the conference information establishment means, a conference notification preparation means for preparing automatically the conference notification based on the conference information established by the conference information establishment means, a distribution destination establishment means for establishing distribution destination of the conference notification prepared by the conference notification preparation means, a conference notification distribution means for distributing automatically the conference notification prepared by the conference notification preparation means to the distribution destination established by the distribution destination establishment means through an electronic mail, and a conference notification reception means for receiving the conference notification distributed by the electronic mail of the conference notification distribution means, wherein the conference information establishment means is connected to the conference information management means through circuit network.

According to another aspect of the present invention, there is provided a video conference reservation system wherein there exists a plurality of means for day and time when a conference is held.

According to still another aspect of the present invention, there is provided a video conference reservation system wherein there is further provided with an electronic mail transmission means in which a conference member terminal which receives the conference notification communicates to a conference member terminal which reserves a video conference through the electronic mail, while referring to the conference notification.

According to still another aspect of the present invention there is provided a method of video conference reservation comprising the steps of triggering a conference program of a video conference, a conference member terminal is automatically connected to a conference control device through a first circuit network, establishing a day which is to hold a video conference to the conference control device from key board, selecting a place where is to participate to the video conference by means of a mouse for example, to establish to the conference control device, establishing the conference participation point, connecting configuration concerning the conference to be held such as circuit speed establishment, multi place conference, broadcasting type conference or the like to the conference control device, judging whether or not a second circuit network is a leased line, such the second circuit network connecting the conference control device to the first to the n-th video conference terminals, establishing either a call originating being implemented from the conference control device to the first to the n-th video conference terminals, or a call originating being implemented from the first to the n-th video conference terminals to the conference control device, establishing start time and end time of the video conference to be reserved to the conference control device, establishing title of conference of the video conference to be held, communication destination of the subscriber and so forth, displaying a confirmation screen for implementing whether or not there is formed established content of reservation of the video conference by way of notification of the conference to be held to the conference member terminal, preparing the notification of the conference, displaying a selection screen for selecting whether there is distributed by the electronic mail or there is distributed the notification of the conference with it printed to the conference member terminal, selecting the electronic mail address of transmission destination from the electronic mail address stored in the electronic mail address storing section within the conference control device, displaying selection screen for selecting whether or not there is terminated a video conference reservation program, and terminating the reservation program of the video conference while disconnecting connection to the conference control device.

According to still another aspect of the present invention there is provided a storage media stored therein a video conference reservation program in which a day and time when a video conference is held is established beforehand comprising the steps of, a processing for managing a conference establishment information established by a conference member terminal, a processing for preparing a conference notification based on the conference establishment information, a processing for distributing the prepared conference notification to the established distribution destination, while the conference reservation program causes the whole processing to be executed by means of a computer.

As stated above, according to the aspects of the present invention, when a video conference is reserved, there is automatically prepared a conference notification in accordance with a reserved conference information to distribute automatically by means of an electronic mail, thus there is no time-consumption of distributing the conference notification.

Since there is referred to the conference notification by the terminal which is in use under normal conditions instead of the special purpose terminal, there is no time-consumption of referring to the distributed conference notification.

Since there is reserved the video conference through the circuit network from the terminal which is in use under normal conditions instead of the special purpose terminal, there is no time-consumption of reserving the video conference.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 5 is a view showing one example of a conference notification;

DETAILED DESCRIPTION OF THE PREFERRED EMBODIMENT

A preferred embodiment of the present invention will be described in detail in accordance with accompanying drawings.

Figure 1:
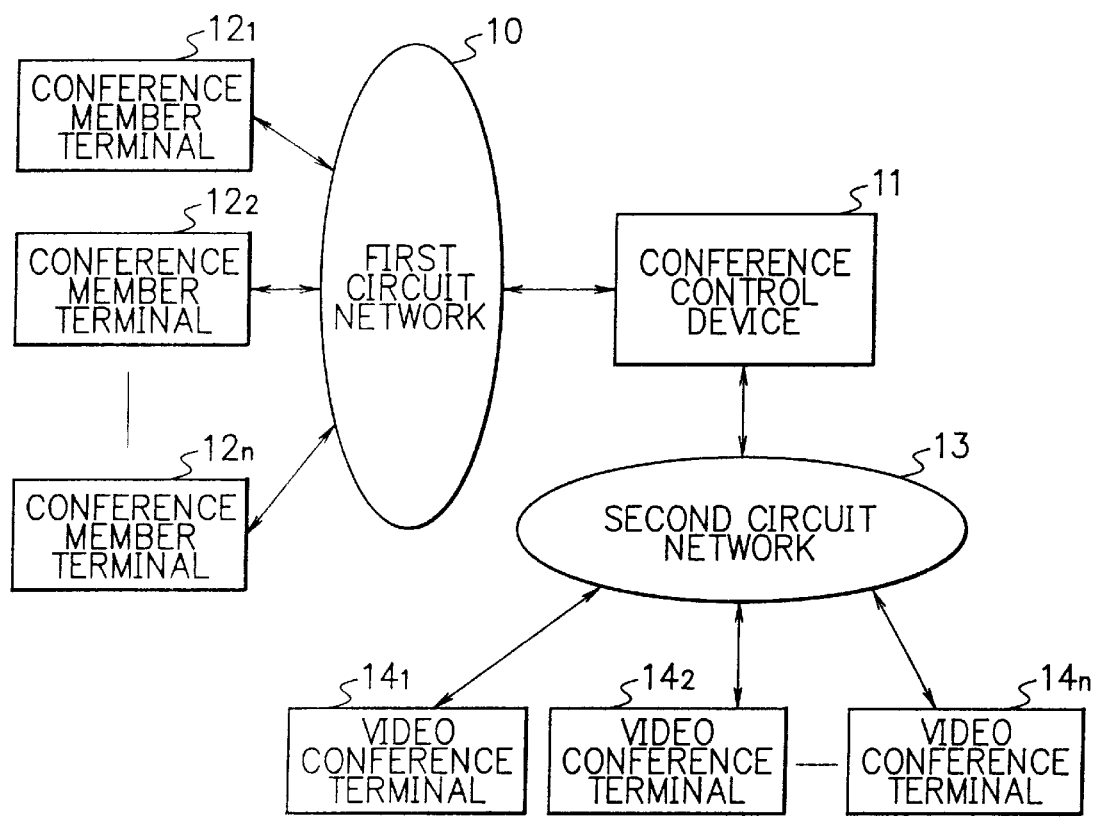
FIG. 1 is a constitution view showing a video conference reservation system according to one embodiment of the present invention.

Referring to FIG. 1, a video conference reservation system according to a first embodiment of the present invention comprises a first circuit network 10, a conference control device 11, a first to n-th conference member terminals $12_1$ to $12_n$, a second circuit network 13, and a first to n-th video conference terminals $14_1$ to $14_n$.

The conference control device 11 and the first to the n-th conference member terminals $12_1$ to $12_n$ are connected to the first circuit network 10 through communication channel of respective communication cables and so forth. The first to the n-th video conference terminals $14_1$ to $14_n$ and the conference control device 11 are connected to the second circuit network 13 through the communication channel of respective communication cables and so forth.

The first circuit network 10 is a circuit network of LAN (Local Area Network) and so forth. The second circuit network 13 is a leased circuit network, an ISDN network (Integrated Services Digital Network), radio communication network or the like.

The conference control device 11 is constituted such that there is implemented acceptance of a video conference reservation in relation to the first to the n-th conference member terminals $12_1$ to $12_n$ through the first circuit network 10, thus enabling the video conference to be held to control automatically among the points where conference is held frequently in relation to the first to the n-th video conference terminals $14_1$ to $14_n$ which are connected through the second circuit network 13 in accordance with reserved conference information.

The first to the n-th conference member terminals $12_1$ to $12_n$ are terminals of personal computer and so forth which are used generally by conference members, thus enabling the terminals to be connected to the first circuit network 10. Furthermore, it is capable of reserving the video conference, and it is capable of receiving notification of holding conference of the video conference reserved due to transmission-reception means of electronic mail, and it is capable of communicating attendance or absence for the conference to the subscriber by the electronic mail.

Figure 2:
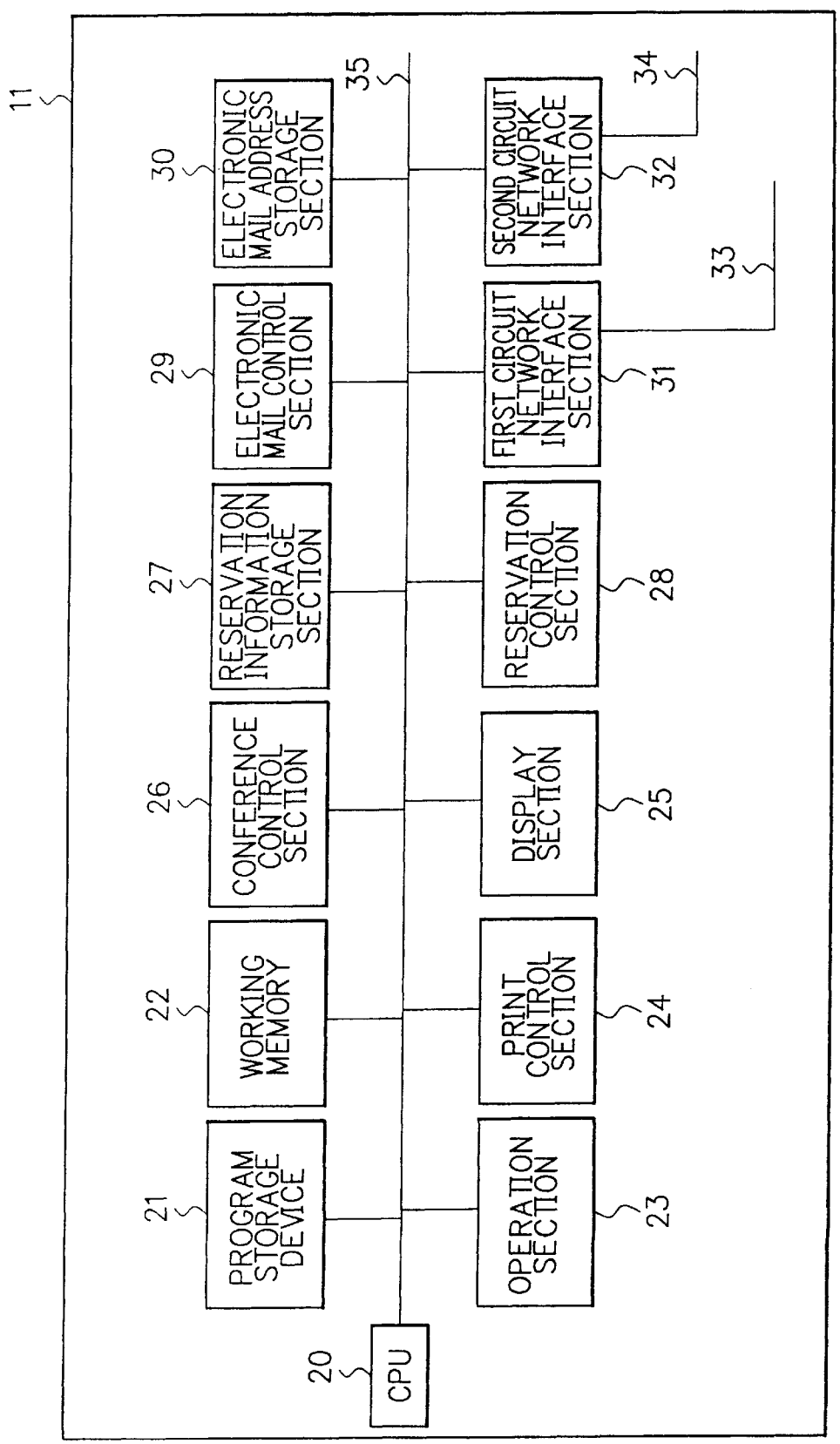
FIG. 2 is a block diagram showing constitution of a conference control device in FIG. 1.

Referring to FIG. 2, the conference control device 11 consists of a CPU 20, a program storage device 21, a working memory 22, an operation section 23, a print control section 24, a display section 25, a conference control section 26, a reservation information storage section 27, a reservation control section 28, an electronic mail control section 29, an electronic mail address storage section 30, a first circuit network interface section 31, and a second circuit network interface section 32. The respective sections are connected with each other through the CPU bus 35.

The CPU 20 is connected to respective sections within the conference control device 11 through the CPU bus 35 of the data bus and so forth. The program storage device 21 consists of storage media of for instance, ROM (read only memory) or magnetic disk and so forth, thus storing therein program for implementing various kind of control of the conference control device 11.

The working memory 22 is a memory for temporary storing therein data which is necessary for control of the CPU 20 to be constituted by, for instance, RAM (random access memory). Furthermore, reservation data exchanging with the subscriber at the time of reservation or the like is stored temporarily in the working memory 22.

The operation section 23 consists of a keyboard, a mouse, a touch panel, and so forth.

The print control section 24 enables for instance, information of state of the reservation of the video conference and so forth to be printed while connecting the printer such as laser printer and so forth.

The display section 25 is a display device consisting of a CRT (cathode ray tube) or liquid crystal display or the like.

The conference control section 26 implements conference holding control of circuit connection and so forth in accordance with reservation information.

The reservation information storage section 27 is constituted by a storage media of a magnetic disk and so forth, thus storing therein a reserved conference information.

The reservation control section 28 implements control of acceptance control of reservation and reservation information.

The electronic mail control section 29 implements distributing control at the time when there is distributed the notification of holding conference through the electronic mail.

The electronic mail address storage section 30 consists of a storage media of a magnetic disk and so forth, thus storing therein a data for selecting the electronic mail address of transmitting destination when there is established the notification of holding conference while transmitting by the electronic mail at the time of reservation.

The first circuit network interface section 31 is connected to the first circuit network 10 through the circuit network connection cable 33. The second circuit network interface section 32 is connected to the second circuit network 13 through the circuit network connection cable 34.

Figure 3:
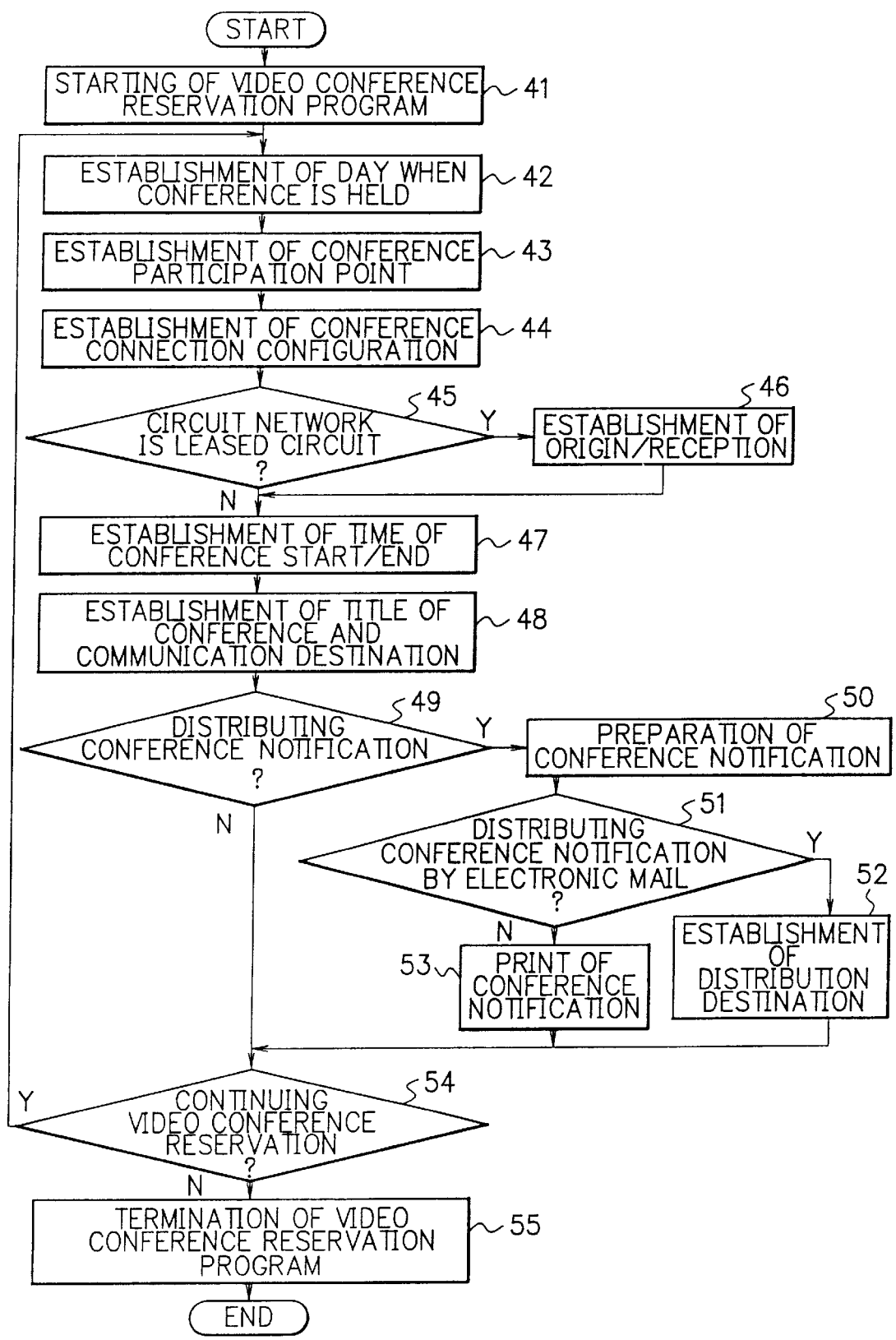
FIG. 3 is a flow chart showing reservation processing of the video conference.

Next, there will be described processing of reservation of the video conference due to the first to the n-th conference member terminals $12_1$ to $12_n$ using flow chart shown in FIG. 3.

There is assumed that the conference member terminal $12_1$, implements the reservation of the video conference.

When the conference member terminal $12_1$ triggers a conference program of the video conference, the conference member terminal $12_1$ is automatically connected to the conference control device 11 through the first circuit network 10 (STEP 41).

When connection is completed, since there is displayed screen on which establishment of the day when a conference is held on the conference member terminal $12_1$, thus the conference member terminal $12_1$ establishes a day which is to hold a video conference to the conference control device 11 from key board (conference information establishment means) (STEP 42). When the day which a conference is held is established, since there is displayed a conference participation point list which is registered in the conference control device 11 on the conference member terminal $12_1$, the conference member terminal $12_2$ selects a place where is to participate to the video conference by means of a mouse for example, to establish to the conference control device 11 (STEP 43). Further, it is also capable of inputting a place where is not registered in the conference participation points list. When there is established the conference participation point, there is established connecting configuration concerning the conference to be held such as circuit speed establishment, multi points conference, broadcasting type conference or the like to the conference control device 11 (STEP 44).

The conference control section 26 judges whether or not the second circuit network 13 is the leased circuit such the second circuit network 13 connecting the conference control device 11 to the first to the n-th video conference terminals $14_1$ to $14_n$ (STEP 45). When the second circuit network 13 is a switched line of the ISDN circuit and so forth, thus establishing either a call originating is implemented from the conference control device 11 to the first to the n-th video conference terminals $14_1$ to $14_n$, or a call originating is implemented from the first to the n-th video conference terminals $14_1$ to $14_n$ to the conference control device 11 (STEP 46).

When there is established the conference connecting configuration, or origin/reception, the conference member terminal $12_1$ establishes start time and end time of the video conference to be reserved to the conference control device 11 (STEP 47). When the conference start/end time is established, the conference member terminal $12_1$ establishes title of conference of the video conference to be held, communication destination of the subscriber and so forth (STEP 48). The above-described conference information is stored in the reservation information storage section 27 which is the conference information control means.

The reservation control section 28 of the conference control device 11 displays a confirmation screen for implementing whether or not there is formed established content of reservation of the video conference by way of notification of the conference to be held to the conference member terminal $12_1$ (STEP 49), when there is distributed the notification of the conference to be held, the reservation control section 28 (conference notification forming means) forms the notification of the conference (STEP 50), thus the reservation control section displays a selection screen for selecting whether there is distributed by the electronic mail or there is distributed the notification of the conference with it printed to the conference member terminal $12_1$ (STEP 51). When there is selected distribution by the electronic mail, the conference member terminal $12_1$, selects the electronic mail address of transmission destination from the electronic mail address stored in the electronic mail address storage section 30 within the conference control device 11 (STEP 52). Further, when an electronic mail address which is to distribute the notification of conference of the video conference is not registered in the electronic mail address storage section 30, it is capable of inputting the electronic mail address of destination to be sent directly.

When there is selected that the notification of the conference is not distributed by the electronic mail at the selection screen indicating method of distributing the notification of conference, the reservation control section 28 outputs to be printed the notification of conference to the printer and so forth connected to the conference member terminal $12_1$ (STEP 53).

When there is selected that distribution is not implemented at the selection screen for selecting whether or not the notification of conference is distributed, there is displayed selection screen for selecting whether or not there is terminated a video conference reservation program (STEP 54). When there is selected that the reservation of the video conference is to continue, the screen is shifted to establishment screen of the day when a conference is held (STEP 42). When there is selected that the reservation of the video conference is not to continue, there is terminated the reservation program of the video conference while disconnecting connection to the conference control device 11 (STEP 55).

Figure 4:
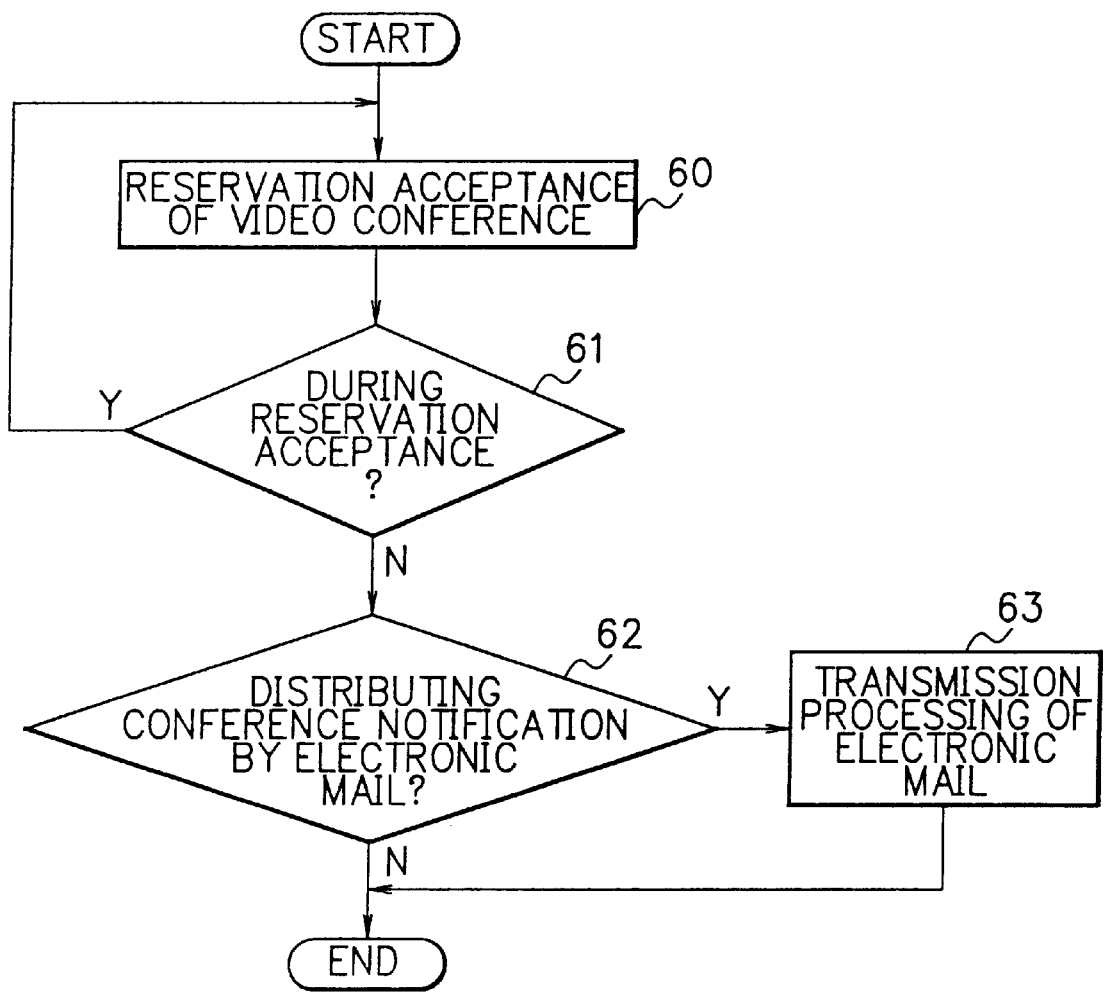
FIG. 4 is a flow chart showing a processing of distributing a conference notification while receiving reservation of the video conference.

Next, there will be described processing of distributing the notification of conference of the video conference of the conference control device 11 using flow chart shown in FIGS. 3 and 4.

There is assumed that the reservation of the video conference is started by any one of the first to the n-th conference member terminals $12_1$ to $12_n$ (STEP 60). When there is completed the reservation while establishing distribution destination of the notification of conference, after establishing that there is distributed the notification of conference by the electronic mail with the reservation started (STEPs 61 to 62), thus implementing transmission processing of the notification of conference by the electronic control section 29 in relation to the established electronic mail address (STEP 63).

The notification of conference transmitted by the electronic mail is automatically transmitted to the electronic mail address established by way of the distribution destination through the first circuit network 10. Receiver of the notification of conference receives to be referred to the notification of conference due to the receiving means of the electronic mail of the first to the n-th conference member terminals $12_1$ to $12_n$. The notification of conference can be referred to by one example of form of the notification of conference shown in FIG. 5.

When the member of conference who refers to the notification of conference intends to communicate the subscriber in order to notify that it is incapable of attending the video conference at the day and time described in the notification of conference, it is capable of communicating that there can not be participated to the video conference through the electronic mail to the subscriber due to the electronic mail transmitting means of the first to the n-th conference member terminals $12_1$ to $12_n$ while watching communication destination displayed one example of the notification of conference shown in FIG. 5. The subscriber who receives communication implements the same processing as the reservation processing of changing the day and time when a conference is held on the reservation program of the video conference.

Figure 6A:
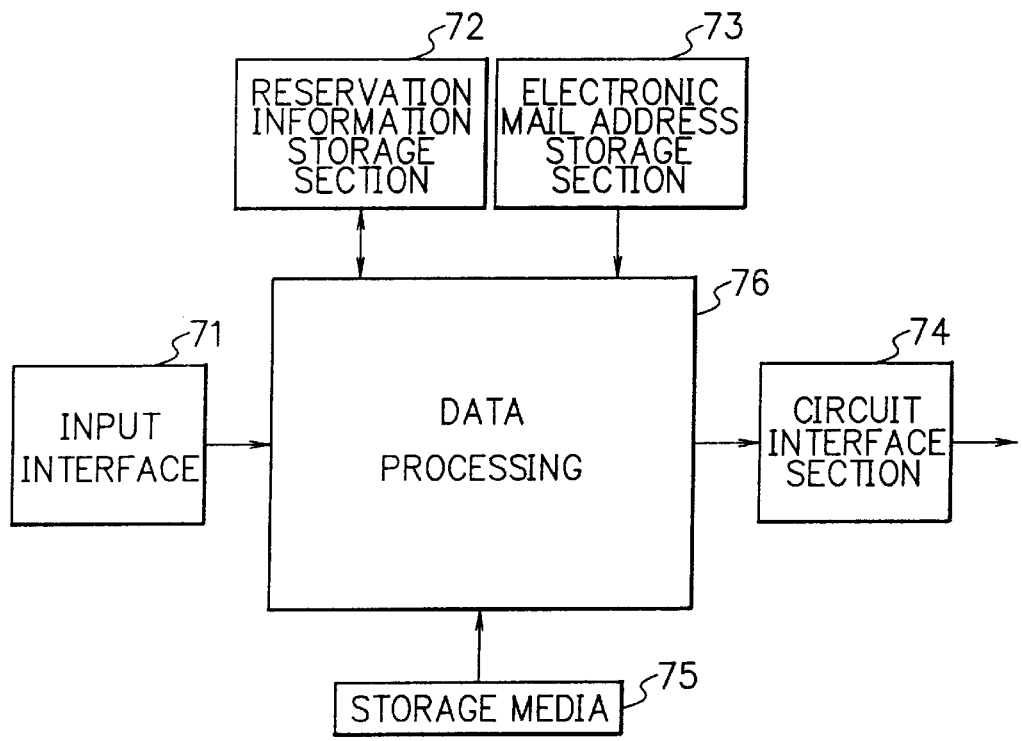
FIG. 6A is a constitution view showing a video conference reservation apparatus according to another embodiment of the present invention.
Figure 6B:
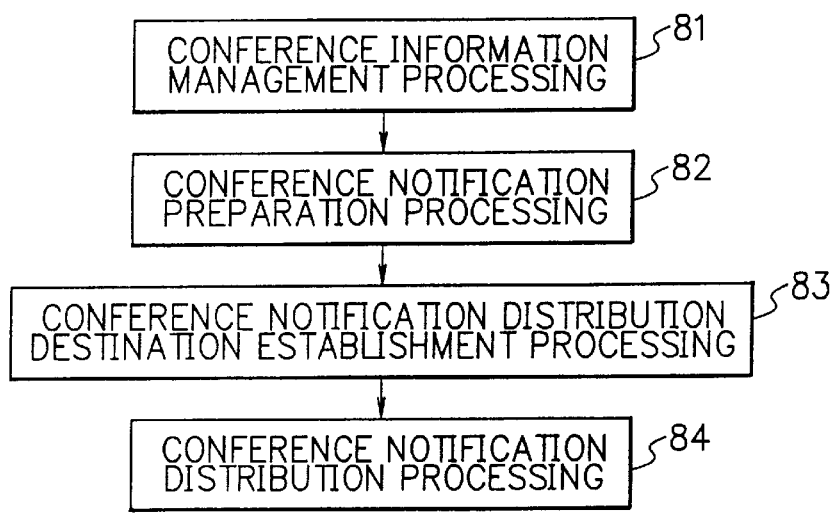
FIG. 6B is a constitution view showing a storage media in FIG. 6A.

FIG. 6A is a constitution view showing a video conference reservation apparatus according to another embodiment of the present invention. FIG. 6B is a constitution view showing a storage media 75 in FIG. 6A.

The video conference reservation apparatus comprises an input interface 71 in terms of the conference member terminals $12_1$ to $12_n$ in FIG. 1, a reservation information storing section 72 for storing established conference reservation information, an electronic mail address storage section 73 which stores therein an address of the electronic mail, a circuit interface section 74 in terms of the conference member terminals $12_1$ to $12_1$, a storage media 75 storing therein the video conference reservation program, and a data processing device 76 for reading the video conference reservation program from the storage media 75 to be executed.

The video conference reservation program shown in FIG. 6B comprises a conference information control processing 81 which causes conference information (a day and time when a conference is held, conference participation point, title of conference and so forth) inputted through the input interface 71 to be stored in the reservation information storage section 72, a conference notification formation processing 81 for forming the conference notification based on the conference information stored in the reservation information storage section 72, a conference notification distribution destination establishment processing 83 for establishing distribution destination of the conference notification, and a conference notification distribution processing 84 for transmitting the conference notification through the circuit interface section 74 while reading the address of destination of established conference notification from the electronic mail address storage section 73.

As described above, according to the present invention, there are effects as follows:

When a video conference is reserved, there is automatically formed a conference notification in accordance with a reserved conference information to distribute automatically by means of an electronic mail, thus there is no time-consumption of distributing the conference notification.

Since there is referred to the conference notification by the terminal which is in use under normal conditions instead of the special purpose terminal, there is no time-consumption of referring to the distributed conference notification.

Since there is reserved the video conference through the circuit network from the terminal which is in use under normal conditions instead of the special purpose terminal, there is no time-consumption of reserving the video conference.

While preferred embodiments of the invention have been described using specific terms, such description is for illustrative purpose only, and it is to be understood that changes and variations may be made without departing from the spirit or scope of the following claims.

What is claimed is:

1. A method of video conference reservation comprising the steps of:

triggering a conference program of a video conference, a conference member terminal is automatically connected to a conference control device through a first circuit network;

establishing a day which is to hold a video conference to the conference control device from key board;

selecting a place where is to participate to the video conference by means of a mouse for example, to establish to the conference control device;

establishing the conference participation point, connecting configuration concerning the conference to be held such as circuit speed establishment, multi place conference, broadcasting type conference or the like to the conference control device;

judging whether or not a second circuit network is a leased line, such the second circuit network connecting the conference control device to the first to the n-th video conference terminals;

establishing either a call originating being implemented from the conference control device to the first to the n-th video conference terminals, or a call originating being implemented from the first to the n-th video conference terminals to the conference control device;

establishing start time and end time of the video conference to be reserved to the conference control device;

establishing title of conference of the video conference to be held, communication destination of the subscriber and so forth;

displaying a confirmation screen for implementing whether or not there is formed established content of reservation of the video conference by way of notification of the conference to be held to the conference member terminal;

forming the notification of the conference;

displaying a selection screen for selecting whether there is distributed by the electronic mail or there is distributed the notification of the conference with it printed to the conference member terminal;

selecting the electronic mail address of transmission destination from the electronic mail address stored in the electronic mail address storing section within the conference control device;

displaying selection screen for selecting whether or not there is terminated a video conference reservation program; and terminating the reservation program of the video conference while disconnecting connection to the conference control device.

* * * * *